United States Patent [19]

Norris

[11] 4,204,752
[45] May 27, 1980

[54] PORTABLE CARD MOTION PICTURE VIEWER

[75] Inventor: Philip R. Norris, North Reading, Mass.

[73] Assignee: Polaroid Corporation, Cambridge, Mass.

[21] Appl. No.: 47,057

[22] Filed: Jun. 11, 1979

[51] Int. Cl.² ............................................. G03B 41/00
[52] U.S. Cl. ...................................................... 352/82
[58] Field of Search ............................... 352/82, 83, 98

[56] References Cited

U.S. PATENT DOCUMENTS

| 1,210,887 | 1/1917 | Bettini . | |
|---|---|---|---|
| 1,231,961 | 7/1917 | Stoffels . | |
| 1,933,057 | 10/1933 | Harkin . | |
| 2,950,644 | 8/1960 | Land et al. . | |
| 3,438,698 | 4/1969 | Triggs | 350/250 |
| 3,450,468 | 6/1969 | Davidson et al. . | |
| 3,721,491 | 3/1973 | Downey | 352/72 |
| 4,104,659 | 8/1978 | Douglas | 354/170 |

Primary Examiner—Monore H. Hayes
Attorney, Agent, or Firm—David R. Thornton

[57] ABSTRACT

A photographic viewing system for use with a film unit having images formed in arcuate, or crescent-shaped, rows thereon. The system utilizes a fixed light source for directing light to a selected arcuate row of images which are to be sequentially viewed and an optics system moves along an arcuate path which corresponds to such selected arcuate row of images so as to produce sequential optical images representing the image on the film unit. A viewing means, such as a monocular eyepiece member or a projection system, provides for the viewing of the optical images that are so produced. The rate of image production is controlled by control of a variable speed motor by the operator. The overall system can be fabricated as a compact, lightweight handheld unit.

8 Claims, 9 Drawing Figures

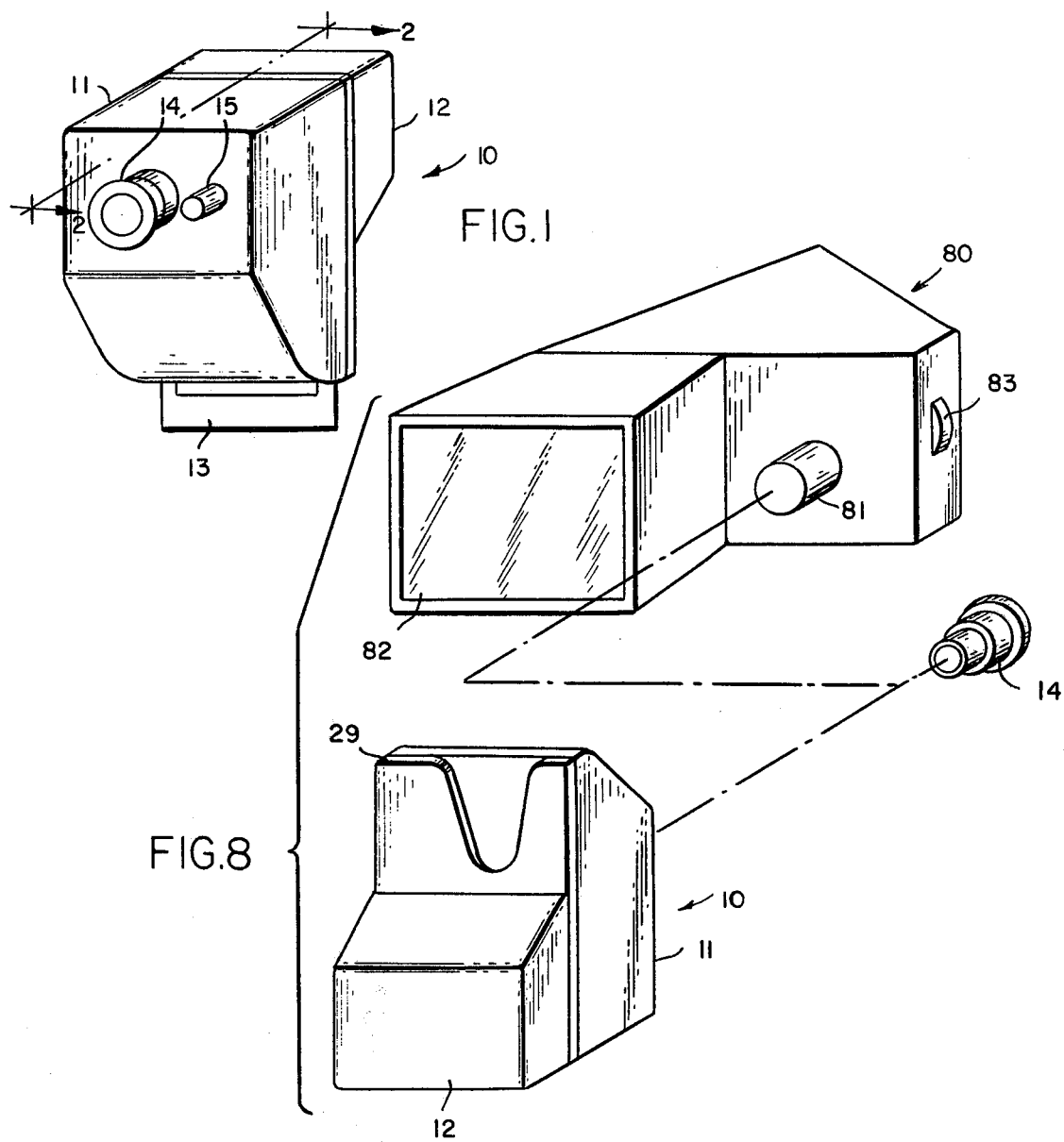
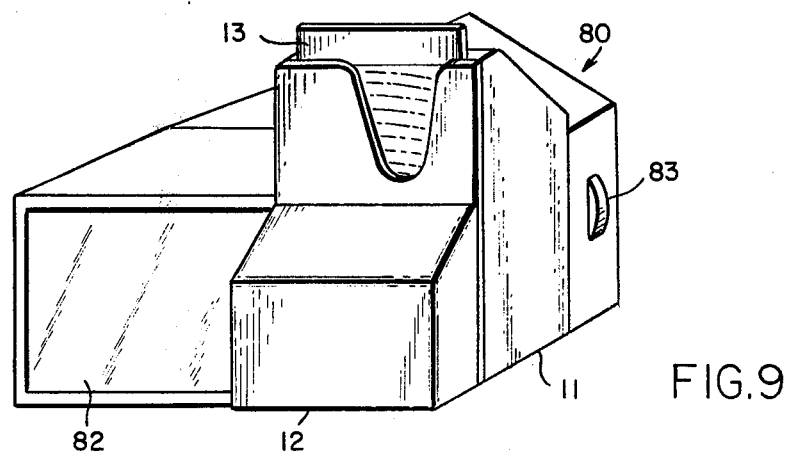

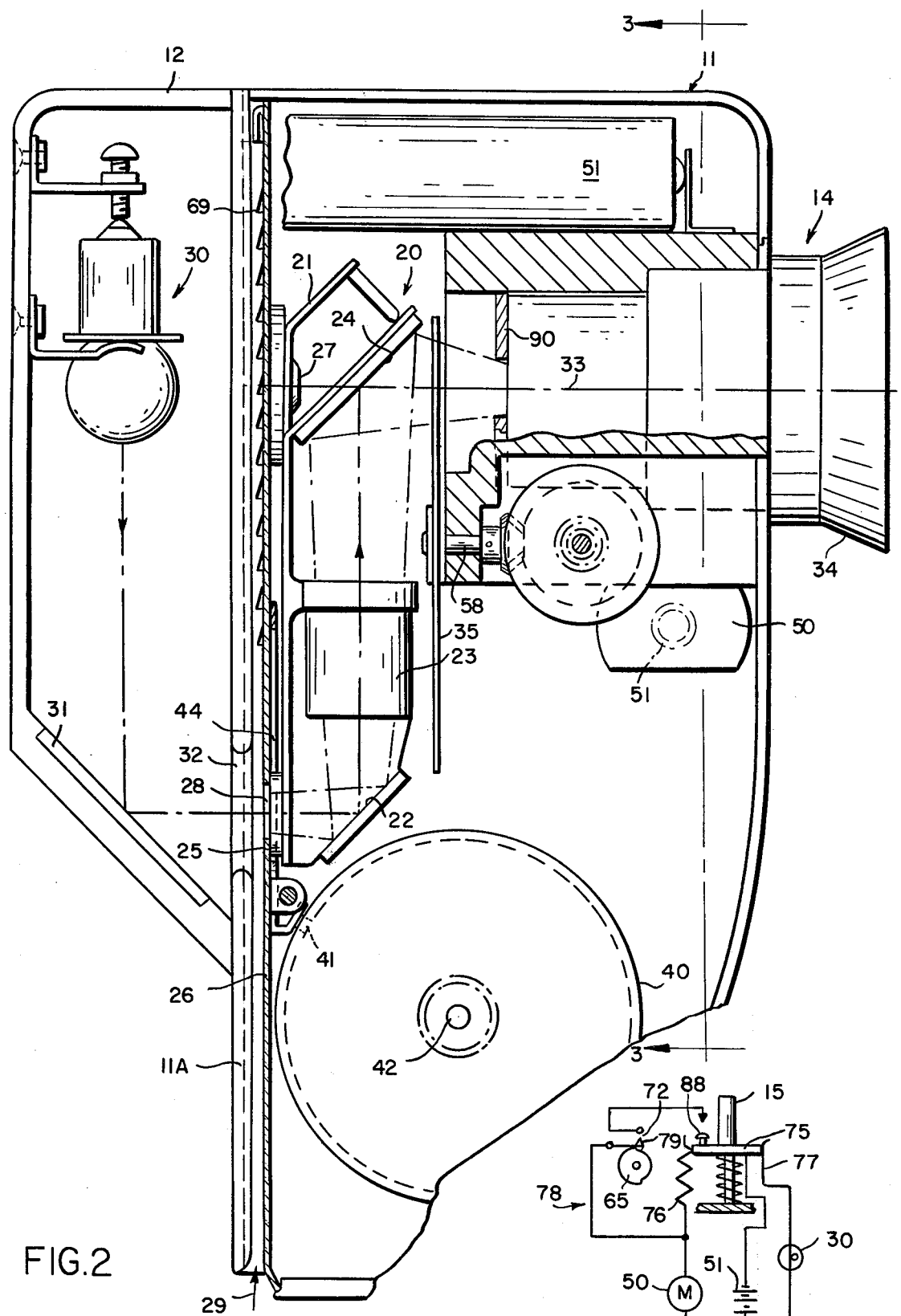

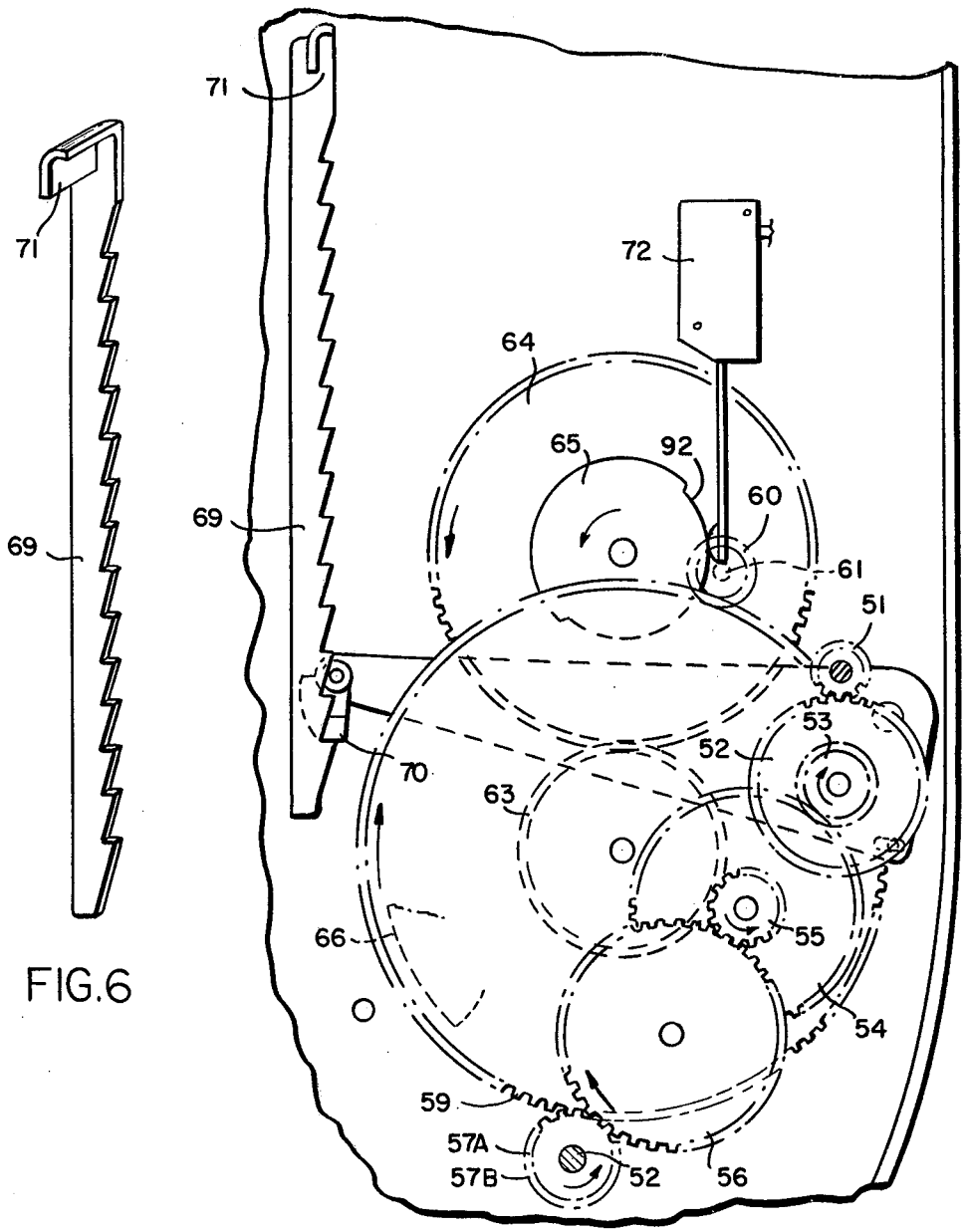
FIG.6
FIG.4
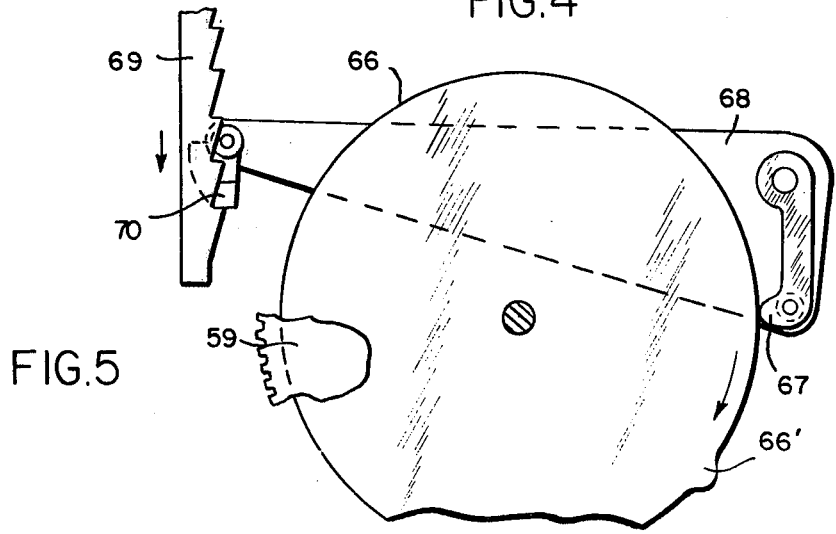
FIG.5

PORTABLE CARD MOTION PICTURE VIEWER

BACKGROUND OF THE INVENTION

This invention relates generally to motion picture viewing systems and, more particularly, to systems which utilize separate film transparency units as opposed to utilizing continuous reels of film therefor.

Present day motion picture taking and projection systems utilize continuous reels of film in which a plurality of sequentially produced images are vertically positioned along a continuous film roll during the picture taking process, reels of 50 feet, 100 feet, 500 feet, 1000 feet, etc. being utilized to store such rolls of film images. During projection onto a screen the sequentially filmed image transparencies on a film roll were vertically and intermittently moved past a suitable light and optical system so as to be intermittently projected onto a screen via an appropriate projection lens system at a rate which provides to the viewer a substantially continuous motion of the projected images on the screen.

A problem in such conventional motion picture systems lies in the difficulty in evaluating a scene which has been taken until the entire film roll has been utilized and developed for projection. Even where substantially instantaneous development can be achieved such evaluation must often await the projection of a significant portion of a film roll containing a large number of different scenes before a particular scene can be looked at for such evaluation.

It is desirable, therefore, to design a motion picture taking system in which scenes of average length (e.g., the time of an average scene is often about 10–15 seconds) can be more easily evaluated without having to review other scenes of no particular interest at the time. Such a design also makes it possible to view such relatively short scenes substantially immediately after taking, either in transparency form or in projected form.

One approach to such a problem which has been suggested in the past is to form a plurality of sequentially produced images on a relatively larger transparency film unit, or plate. An entire motion picture can be obtained by providing a plurality of such plates for sequential use in taking or projecting. Such systems have not found favor because the format of such sequentially produced images on the plate and the mechanisms for producing such format have not been acceptable in terms of the size or capability thereof to produce effective motion picture image projection.

For example, some techniques have suggested the use of a fixed lens system coupled with a movable plate, the latter being capable of movement in two orthogonal directions so that the multiple images are placed thereon in parallel rows. Since the plate must move from one side to the other as it passes adjacent the lens systems, the camera housing must be at least twice the width of the plate itself and, hence, the size of the camera has become so unwieldy that its use is awkward and undesirable. Other suggested techniques using a substantially fixed optics system have required the photographic plate to be moved in a spiral or ring configuration which requires rather complex mechanical structures for guiding the plate movement in the correct direction.

Still other suggestions have involved the use of systems where both the plate and the optics system move, the plate normally moving in a first direction and the optics moving in an orthogonal direction. In such cases the plate remains in a fixed position while the lens system, in effect, scans the plate in a fixed linear direction orthogonal to the plate's motion, the plate moving forward between each orthogonal scan so that parallel rows of images are obtained. At the end of each lateral orthogonal scan the optics is required either to fly back rapidly to its initial position for the next scan or to scan in the opposite direction for alternate rows of images. Placing the images on the film in parallel rows utilizing a moving lens axis, the translational motion of the lens being either perpendicular or parallel to the lens viewing axis, tends to cause an uncomfortable illusion to the viewer of rhythmic camera motion when viewed by a projection system. Moreover, the lens axis in either case (whether the lens axis is parallel or perpendicular to the optics system motion) changes position with respect to the scene being taken.

In view of such problems it is desirable to design a system utilizing a plurality of separate film units, each of which has multiple images, e.g., transparent images, thereon, in which the illusion of rhythmic camera motion in the projection of such images can be avoided. Picture taking apparatus for such purpose is described in the commonly assigned copending applications Ser. No. 047024 entitled "Card Motion Picture Camera System" and Ser. No. 047115 entitled "Card Motion Picture Camera", both filed on the same day as this application, and incorporated herein by reference, wherein the lens axis is maintained in a fixed position relative to the camera housing during the picture taking process so that the distance and direction to the subject being taken remains the same so long as the camera itself is not moved.

An apparatus for the projection on a screen of images on a plurality of such film units, the latter for example being supplied to the projection system in sequence from a stack thereof, is described in copending application Ser. No. 047141 entitled "Card Motion Picture Projection System" also filed on the same day as this application, and incorporated herein by reference. The projection system described therein provides a continuous motion of the action depicted on the film unit images while avoiding the illusion of rhythmic camera motion during the viewing of the projected images.

It is desirable also to be able to readily view in the field a single scene of a motion picture which may consist only of the film images on a single film unit or on a relatively few of such film units. Accordingly, it would be helpful for one making a motion picture to have available a compact, portable and lightweight viewing apparatus which can be easily operated in the hands and which can be used to quickly view the images on a single film unit. If, as preferred, the film unit is of the "instant" development type, the camera operator can immediately preview a single scene, after it has been taken, using such an apparatus to determine whether the scene must be retaken or must be modified before such retake, for example. Much cost, time and effort can thereby be saved by such an instant viewing process either in a studio environment or at a remote location.

SUMMARY OF THE INVENTION

In accordance with a preferred embodiment of the invention, an image viewing apparatus sometimes referred to herein as a previewer apparatus, utilizes an optics system mounted on a rotatably movable boom member mounted adjacent one side of a film unit having a plurality of images formed in arcuate rows thereon and a lighting system fixedly mounted on the other side thereof. The apparatus is arranged so that light rays are directed toward the film unit images, which light rays pass through the images as they are sequentially presented to the optics system via appropriate gating means, the corresponding optical images formed thereby being transmitted to a suitable eyepiece for viewing. Regardless of the angular position of the optics boom about its pivot axis, the output axis of the rays from the optics system, as directed to the eyepiece remain effectively fixed relative to the projector housing and the size and focus of the images projected to the viewer are the same as each image is sequentially transmitted thereto. Appropriate gating mechanisms positioned effectively at the plane of the film unit together with a suitable shutter means are utilized to delineate each image frame as the optics system boom rotates. The transparent images on the film unit, as discussed in the above-referenced copending applications, are formed in arcuate, or crescent-shaped, rows thereof.

In the preferred embodiment of the invention the film unit can be manually inserted into the viewing apparatus, the overall apparatus being fabricated as a compact unit so that it can be readily hand held by a viewer during the viewing process. Further, the apparatus can be adapted for use with an auxiliary screen unit which can be substituted for the single eye piece so that the sequence of images can be easily viewed by more than one person.

DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 shows a perspective view of one embodiment of the viewing apparatus of the invention utilizing an eye piece;

FIG. 2 shows a sectional view, partly in elevation, of the apparatus of the invention taken along line 2—2;

FIG. 4 shows a view of the gearing mechanism of the apparatus of FIG. 2 generally along the plane 4—4 thereof;

FIG. 5 shows a more detailed view of a portion of the gearing mechanism and the film unit advance mechanism shown in FIG. 4;

FIG. 6 shows a perspective view of a portion of the film unit advance mechanism shown in FIG. 5;

FIG. 7 shows a schematic diagram of a switching circuitry for operating the motor and lighting system of the invention;

FIG. 8 shows an exploded perspective view of an alternative embodiment of the invention utilizing a projection screen viewing system; and FIG. 9 shows a perspective view of the screen viewing system of FIG. 8 in assembled form.

DESCRIPTION OF THE PREFERRED EMBODIMENTS

Figure 3:
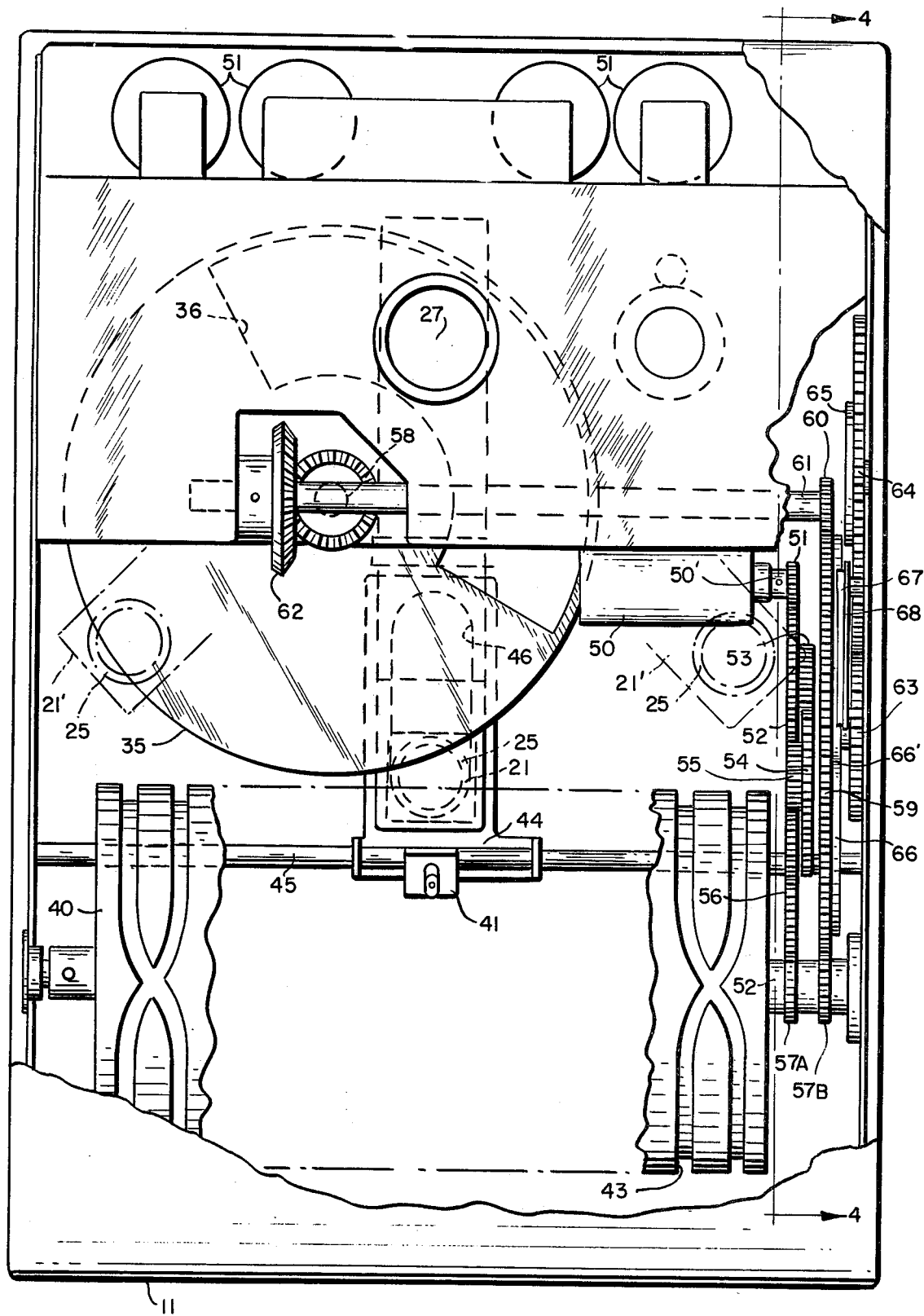
FIG. 3 shows a sectional view of the apparatus of the invention taken along the line 3—3 of FIG. 2.

As can be seen in FIG. 1, the viewing apparatus 10 of the invention comprises a housing which includes a first housing section 11 which houses the optics system, the motor and motor actuation system, and the mechanical coupling members of the apparatus; and a second housing section 12 which houses the lighting system of the apparatus. As is shown more clearly in subsequent figures, a film unit 13 is located at a focal plane by manual insertion in a suitable opening or slot 29 (more readily seen in FIG. 2) for receiving the film unit for viewing a sequence of film images. As discussed in the above-noted copending applications, in a preferred embodiment film unit 13 has a plurality of transparent images thereon arranged in a plurality of parallel, arcuate-shaped rows.

In the present embodiment, the film unit is manually fully inserted into the apparatus 10 and then, as explained below, suitably moved in an intermittent fashion so that the optics system sequentially scans each row of images in a reciprocating manner until all the rows of images desired to be viewed have been so scanned. The film unit can then be manually withdrawn from the apparatus.

Each film unit and the images thereon can be of such a size as to contain an average scene which, as discussed above, may take from 10 to 15 seconds, for example, when viewed in sequence. If the film is of the "instant" developing type, the scene can be viewed substantially immediately after taking and can thereupon be evaluated directly in the field without the necessity for waiting for subsequent development at the studio. Accordingly, the use of such a previewer apparatus can be of great assistance in the movie taking process. For example, the evaluation may indicate the necessity for retaking the scene immediately, for modifying the scene before retake, and the like, as mentioned above.

In the embodiment shown in FIG. 1, the scene can be viewed by an individual through an eye piece viewing member 14 and the movement of the optical system for scanning the rows of images can be actuated by an appropriate motor operating button 15 conveniently placed on the housing, as discussed in more detail below.

As particularly seen in FIGS. 2 and 3, housing section 11 includes an optics system 20 which comprises means for directing illumination from the film plane to the eye piece 14 and includes a movable optics boom plate or member 21 having a first reflective surface 22, a lens 23, and a second reflective surface 24. Optics boom 21 is also coupled to, or carries thereon a movable gate member 25. Optics boom 21 rotates about a pivot axis 27 (coaxial with viewing axis 33) so that movable gate 25 moves in sequential registry with a plurality of apertures 28 of a fixed gate mechanism 26, the latter apertures being located in an arcuate, or crescent-shaped, path which corresponds to the arcuate or crescent-shaped path of the images in the parallel rows of each film unit 12. These arrangements are substantially similar to those discussed in the above-referenced copending application with, however, the film unit being manually inserted into a slot 29 between fixed gate 26 and the rear plate 11A of housing section 11 in a manner, as later explained in detail, such that when completely inserted, the first row of images thereon is in registry with the arcuate row of apertures 28 of fixed gate 26.

A fixed light source 30 is mounted in housing section 12 such that a light beam, appropriately formed from source 30 by the use, for example, of a suitable parabolic reflector or a Fresnel lens (for clarity, not shown in the drawings), can be reflectively directed to a light reflective mirror 31. It is thereupon reflected through a corresponding arcuate shaped opening 32 in rear plate 11A between housing sections 11 and 12 and thence through the gating apertures 28 and the transparent images on the inserted film unit which is in registry with such gating apertures.

The fixed gate 26 and the arcuate opening 32 in plate 11A define an arcuately curved focal location for a single row of images, while plate 11A and gate 26 in cooperation with the ratchet and pick assembly, later explained in detail, provide guide surfaces for guiding the film unit, as it is inserted, to a position wherein the first row of images is in alignment with the above focal location. In this arrangement, the optics system 20 focuses the film images at a field stop 90 located on axis 33 and the eyepiece magnifies this image for viewing. The stop is made slightly less than the frame area provided by the optics so as to block view of the edges of the movable gate 26.

In contrast to the above-noted projector application wherein the source or light beam moves with the optics boom along each image row, the source 30 herein and mirror 31 cooperate to illuminate a complete row of images at a given time. Hence, a sequence of optical images corresponding to the transparent images on the film unit are thereby projected through moving gate 25 to a reflective surface 22 which reflects such images through a focussing lens 23 and thence to a further reflective surface 24. The reflected images are thereupon directed along an optical path 33 to an eye piece 14 where they can be easily viewed by the operator. A suitable shutter member 35 having a shutter opening 36 is rotatably mounted between the movable optics system 20 and eye piece 14, such shutter being rotated in suitable synchronism with the movement of optics boom 21 so that shutter opening 36 is opposite reflective surface 24 whenever movable gate 25 is in registry with a transparent image on the film unit so that the sequence of film images, as seen in eye piece 14, creates for the viewer a substantially continuous motion of the projected images.

The mechanism for moving optics boom 20 is substantially similar to that described with reference to both the camera and projection apparatus described in the above-referenced applications. Thus, as shown in FIGS. 2 and 3, a barrel cam unit 40 has a cam follower 41 riding thereon, cam unit 40 being rotated about an axis 42 by a suitable motor and gear train, as discussed in more detail below. As cam follower 41 moves along the grooved cam surfaces 43, a moving gate guide member 44 moves linearly in a reciprocal manner along guide rod 45, guide member 44 having a slotted opening 46 therein which engages moving gate 25, the latter in the form of a tubular member, as shown. The reciprocal linear movement of guide member 44 in turn moves gate member 25 in slot 46 which in turn moves the boom assembly 21 on which it is fixedly mounted in a reciprocal manner along an arcuate path about the pivot axis 27 of the boom 21. The extent of the reciprocal arcuate motion is depicted by the phantom drawings of the end of boom 21 indicted by reference numerals 2' in FIG. 3.

Accordingly, the overall optics system including reflecting surfaces 22 and 24 and lens 23, all of which are mounted on rotating boom member 21, reciprocally rotates through an arc which is in registry with the arcuately positioned fixed gate apertures 28 which are in turn in registry with an arcuate row of images on a film unit which has been inserted into the apparatus. The reciprocal motion of cam follower 41 in the grooved surfaces of barrel cam 40 causes the overall optics system to provide a reciprocal scanning of the arcuate rows of film images which are sequentially placed in registry therewith in a manner substantially similar to that described in the aforementioned copending applications.

The motion of the barrel cam, as well as the shutter means and other mechanisms requiring movement in the apparatus, is produced by a suitable DC motor 50, operated by a plurality of batteries 51 mounted at the upper region of housing section 11 shown in FIG. 2. For example, barrel cam 40 is rotated by shaft 52 along axis 42 via a suitable gear train, including gear 51 on motor shaft 50' (see FIG. 4) and intermediate gears 52, 53, 54, 55, 56 and 57A, the latter actuating the shaft 52 of barrel cam 40. The shutter member 35 is rotated about a shaft 58 which is actuated via a gear training comprising gears 57B, 59 and 60, the latter gear driving shaft 61, which shaft in turn drives shutter shaft 58 via bevel gear 62. Such gear train is arranged to rotate shutter 35 at an appropriate speed for synchronizing its operation with that of the optics boom as it sequentially scans the arcuate rows of images.

Once the film unit has been inserted, intermittent movement of the film unit must be provided to bring each successive arcuate row of images into sequential registry with the fixed gate apertures 28. Such intermittent motion is achieved by using ratchet and pawl mechanism 69 and 70, as shown in FIGS. 4, 5 and 6. The ratchet 69 is slidably mounted in a slot 90 of plate 11A and carries a pick member 71 which engages the trailing edge of a film unit at one corner thereof as such film unit is being inserted into the apparatus. Upon insertion through slot 29 (see FIG. 2), the film unit pushes the pick 71 and the ratchet member 69 to its fully cocked position, as shown in FIGS. 2 and 4. When it is desired to view the images on the film unit, depression of the button 15 (FIG. 1) actuates the motor 50, as discussed more fully below, thereby causing rotation of cam 66 (FIG. 5) which is mounted on the same shaft as gear 59. As cam 66 rotates, it carries a cam projection 66' into engagement with a cam follower 67 to pivot the latter in a counterclockwise manner, thereby pivoting lever arm 68 counterclockwise. This moves ratchet 69 one notch or step from its fully cocked position toward the entrance to slot 29; the subsequent clockwise rotation of lever arm 69 causing pawl 70 to drop back to the next notched position. The step movement of ratchet 69 causes the film unit to move, via pick 71, to its next intermittent position whereby the next arcuate row of images is presented in registry with the fixed gate apertures for the next scanning movement of optics system 20.

While a motor driven system is preferred, it should be noted that the drive arrangement can be manually powered, for example by means of a crank or rack arrangement and suitable gearing. Hence, the gears 50–57, 59 and 60, the barrel cam 40, as well as the pick 71 and the ratchet and pawl mechanisms 69 and 70, provide selectively operative means when driven, either electrically by, for example a motor, or manually, for alternately driving said directing means portion, i.e, the boom 21, along its arcuate path and for advancing the film unit one row at a time back through the receiving opening.

The motor and lighting switching circuitry is shown in part in FIGS. 4 and 7, and includes spring-loaded motor operating button 15 having an electrically conductive flange 75 which, when button 15 is depressed (as depicted in FIG. 7), acts as a movable contact arm of a variable resistance 76. When button flange 75 makes contact with resistance 76, the DC motor 50 is actuated by completion of the circuit which includes DC battery power source 51. The speed of motor 50 depends on the value of resistance 76 so that the further the distance to which button 50 is depressed, the faster the motor speed. Hence, flange 75 and contact 76 provide a first motor switch for driving the boom at variable speed. When button flange 75 contacts resistance 76, it also simultaneously contacts a switch contact arm 77 for the lighting circuit so that light source 30 is automatically energized at the same time motor 50 is actuated. Hence, flange 75 and arm 77 provide a lamp switch for energizing the light source.

It has been found that, since the operator can remove the film unit at any point in the viewing cycle, i.e., while the optics boom is in the middle of scanning a row, or on its reverse scan, the scan order of the next film unit can be improper. This is corrected in the novel device by automatically driving the optics boom rapidly back to its starting point when viewing ceases. To this end, the switch 15 also includes a second motor switch 88 which energizes the motor at full speed (upon release of the actuator button) through an auxiliary cam circuit 78, in parallel with resistance 76. Hence, when button 15 is released, motor 50 will be actuated so long as the movable arm 79 of switch 72 rides on the cam portion of cam 65 (as also seen in FIG. 4). This returns the boom member 21 to its starting point. When arm 79 reaches the recessed portion 80, switch 72 is opened and motor 50 is deenergized. The motion of cam 65 is synchronized with the barrel cam so that if the button 15 is released with the optics boom at any image in its scan along one direction of its reciprocal scanning path, the motor is automatically energized to return the system to its position at the beginning of the scan cycle.

The above-described apparatus is a compact, hand-held viewer having an eyepiece for viewing by an individual. Such apparatus, however, can be readily adapted for viewing by more than one person via a suitable screen device, such as shown in FIGS. 8 and 9. As seen therein, the above viewing apparatus 10 (viewed in FIG. 8 from the side opposite to that shown in FIG. 1 and in an orientation inverted from that in FIG. 1) can be combined with a screen viewing device 80. For such purpose, eye piece 34 can be removed from apparatus 10 and a projection lens 81 of device 80 inserted into the opening from which the eye piece has been removed. Suitable reflective surfaces (not shown) within device 80 similar, for example, to the projection apparatus disclosed in the above-noted projector application, direct the optical image from lens 81 to a frosted glass screen 82 at which the image can be directly viewed. A suitable mechanical focusing button 83 conveniently available to the user on the housing of device 80 can be used to permit focusing of the image on screen 82. The overall screen viewer of FIGS. 8 and 9 also provides a compact, lightweight and easily transportable apparatus for use in the field, if desired.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. Viewer apparatus for use with a film unit having a plurality of images recorded in spaced arcuate rows thereon, said apparatus comprising:
    a housing having an opening therein for receiving a film unit at a given film plane;
    a gate member located in adjoining relation to said focal plane, said gate member defining an arcuately curved focal location for a single arcuate row of images;
    guide surfaces for guiding said film unit, as it is inserted through said opening, to a position wherein the first row of said film unit is located in alignment with said focal location;
    means for illuminating each image of the row of images located at said focal location;
    means for sequentially directing image forming light rays from each image along a given path for viewing;
    selectively operative means for alternately driving said directing means portion along its arcuate path and for advancing said film unit intermittently one row at a time to sequentially project said images, said advancing means including advancing said film unit back through said opening as said film unit is intermittently advanced row by row.

2. The apparatus of claim 1 including a monocular eyepiece for viewing of the images transmitted along said path.

3. The apparatus of claim 1 additionally including a viewing screen accessory for directing and focusing image forming light rays along a second path to a viewing screen, said accessory being mountable on said apparatus with said second path of said accessory in alignment with said given path of said apparatus.

4. The apparatus of claim 3 wherein said given path exits from one side of said apparatus, said accessory extends from said one side to a location adjoining the opposite side of said apparatus, and said accessory providing a viewing screen at said location.

5. The apparatus of claim 1 wherein said illuminating means includes fixed means for illuminating the full length of said focal location and thereby simultaneously illuminating a complete row of images of said film unit.

6. The apparatus of claim 1 wherein said selectively operative means for intermittently advancing said film unit includes pick means for engaging and advancing said film unit one row at a time, and said pick means including a pick engageable with a leading edge of said film unit as said film unit is inserted in said opening and displaceable to a cocked position during said insertion.

7. The apparatus of claim 1 wherein said selectively operative means for driving said directing means portion and for advancing said film includes a motor, and said apparatus further includes an actuator switch displaceable in one direction for varying the speed of said motor for thereby varying the scanning speed of said directing means and the frequency of said intermittent advancement.

8. The apparatus of claim 1 wherein said actuator includes means responsive to displacement in an opposite direction for energizing said motor at full speed until said directing means portion is returned to an initial position at the beginning of an image row, and means for biasing said actuator switch in said opposite direction.

* * * * *